United States Patent
Hwang et al.

(10) Patent No.: US 8,509,043 B2
(45) Date of Patent: Aug. 13, 2013

(54) METHOD OF AND APPARATUS FOR RECORDING DATA ON WRITE-ONCE DISC, METHOD OF AND APPARATUS FOR REPRODUCING DATA FROM WRITE-ONCE DISC, AND WRITE-ONCE DISC THEREFOR

(75) Inventors: Sung-hee Hwang, Seoul (KR); Jung-wan Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/422,573

(22) Filed: Mar. 16, 2012

(65) Prior Publication Data

US 2012/0176878 A1    Jul. 12, 2012

Related U.S. Application Data (63) Continuation of application No. 12/014,833, filed on Jan. 16, 2008, now Pat. No. 8,159,915, and a continuation of application No. 12/014,840, filed on Jan. 16, 2008, now Pat. No. 8,098,553, and a continuation of application No. 12/014,847, filed on Jan. 16, 2008, now abandoned, and a continuation of application No. 12/014,828, filed on Jan. 16, 2008, now Pat. No. 8,121,005, said application No. 12/014,847 is a continuation of application No. 11/045,485, filed on Jan. 31, 2005, now Pat. No. 7,573,795, said application No. 12/014,840 is a continuation of application No. 11/045,485, said application No. 12/014,833 is a continuation of application No. 11/045,485, said application No. 12/014,828 is a continuation of application No. 11/045,485.

(30) Foreign Application Priority Data

Feb. 6, 2004    (KR) .................................. 2004-7969
Dec. 15, 2004   (KR) .............................. 2004-106537

(51) Int. Cl.
    *G11B 5/58*    (2006.01)
    *G11B 7/00*    (2006.01)
    *G11B 5/09*    (2006.01)

(52) U.S. Cl.
    USPC .................. 369/53.41; 369/53.17; 369/53.15; 369/47.22

(58) Field of Classification Search
    USPC ...... 369/53.41, 53.17, 53.15, 47.22; 711/112
    See application file for complete search history.

(56) References Cited

U.S. PATENT DOCUMENTS

| | | |
|---|---|---|
| 5,446,857 A | 8/1995 | Russ |
| 5,778,257 A | 7/1998 | Tsukatani et al. |

(Continued)

FOREIGN PATENT DOCUMENTS

| | | |
|---|---|---|
| CA | 2 514 323 | 8/2004 |
| EP | 0 350 920 | 1/1990 |

(Continued)

OTHER PUBLICATIONS

Japanese Office Action issued on Jul. 6, 2010, in corresponding Japanese Patent Application No. 2008-014512 (5 Pages).

(Continued)

*Primary Examiner* — Aneeta Yodichkas
(74) *Attorney, Agent, or Firm* — NSIP Law (57) ABSTRACT

A write-once disc includes: a plurality of update areas in which a predetermined kind of updated information is recorded; at least one main access information area in which main access information is recorded, the main access information indicating a final update area in which finally updated information is recorded among the plurality of update areas; and at least one sub access information area in which sub access information is recorded, the sub access information indicating a location of the finally updated information recorded in the final update area. Accordingly, an access time for reading a predetermined kind of information required to use the write-once disc can be reduced.

2 Claims, 11 Drawing Sheets

(56) References Cited

U.S. PATENT DOCUMENTS

| | | | |
|---|---|---|---|
| 2002/0136134 | A1 | 9/2002 | Ito et al. |
| 2004/0090888 | A1* | 5/2004 | Park et al. .................. 369/47.14 |
| 2004/0145980 | A1* | 7/2004 | Park et al. .................. 369/47.14 |
| 2004/0174793 | A1* | 9/2004 | Park et al. .................. 369/59.25 |
| 2005/0030849 | A1 | 2/2005 | Park |
| 2005/0047294 | A1 | 3/2005 | Park |
| 2005/0281164 | A1 | 12/2005 | Yoshida et al. |
| 2006/0239161 | A1* | 10/2006 | Takahashi et al. ......... 369/53.24 |
| 2008/0068958 | A1 | 3/2008 | Park |
| 2008/0177945 | A1 | 7/2008 | Hwang et al. |
| 2008/0253244 | A1 | 10/2008 | Nijboer et al. |

FOREIGN PATENT DOCUMENTS

| | | | |
|---|---|---|---|
| EP | 1 315 163 | | 5/2003 |
| EP | 0 724 263 | | 11/2003 |
| JP | 64-46280 | | 2/1989 |
| JP | 10-320924 | | 12/1998 |
| JP | 11-039801 | | 2/1999 |
| JP | 2002-288938 | | 10/2002 |
| JP | 2007-501487 | | 1/2007 |
| JP | 2007-501488 | | 1/2007 |
| JP | 2007-520026 | | 7/2007 |
| JP | 2007-520849 | | 7/2007 |
| JP | 2008-112574 | | 5/2008 |
| JP | 2008-171550 | | 7/2008 |
| JP | 2008-171551 | | 7/2008 |
| TW | 295655 | | 1/1997 |
| TW | 540043 | | 7/2003 |
| WO | WO 89/01663 | | 2/1989 |
| WO | WO 93/25956 | | 12/1993 |
| WO | WO 04/059648 | * | 12/2003 |
| WO | WO 2004/077420 | A1 | 9/2004 |
| WO | WO 2004/084217 | | 9/2004 |
| WO | WO 2005/013265 | | 2/2005 |
| WO | WO 2005/013266 | | 2/2005 |
| WO | WO 2005/015558 | | 2/2005 |
| WO | WO 2005/062306 | A1 | 7/2005 |
| WO | WO 2005/073971 | A2 | 8/2005 |

OTHER PUBLICATIONS

Japanese Office Action issued on Feb. 2, 2010, in corresponding Japanese Patent Application No. 2008-014513 (3 Pages).
Japanese Office Action issued on Feb. 2, 2010, in corresponding Japanese Patent Application No. 2006-552041 (3 Pages).
Notice of Allowance dated Aug. 11, 2009, issued in corresponding Taiwanese Patent Application No. 94102853.
Australian Search Report issue in corresponding Singapore Patent Application No. 200507293-9 on Sep. 6, 2006.
U.S. Appl. No. 11/045,485, filed Jan. 31, 2005, Sung-hee Hwang, Samsung Electronics Co., Ltd.
U.S. Appl. No. 12/014,828, filed Jan. 16, 2008, Sung-hee Hwang, Samsung Electronics Co., Ltd.
U.S. Appl. No. 12/014,840, filed Jan. 16, 2008, Sung-hee Hwang, Samsung Electronics Co., Ltd.
U.S. Appl. No. 12/014,847, filed Jan. 16, 2008, Sung-hee Hwang, Samsung Electronics Co., Ltd.
U.S. Appl. No. 12/014,933, filed Jan. 16, 2008, Sung-hee Hwang, Samsung Electronics Co., Ltd.
European Search Report mailed Jun. 12, 2012 in counterpart European Patent Application No. 05726354.3 (4 pages, in English).
European Examination Report mailed Sep. 13, 2012, issused in counterpart European Patent Application No. 05 726 354.3; 6 pages in English language.
European Office Action issued on Feb. 15, 2013 in counterpart European Application No. 05 726 354.3 (5 pages in English).

* cited by examiner

METHOD OF AND APPARATUS FOR RECORDING DATA ON WRITE-ONCE DISC, METHOD OF AND APPARATUS FOR REPRODUCING DATA FROM WRITE-ONCE DISC, AND WRITE-ONCE DISC THEREFOR

CROSS-REFERENCE TO RELATED APPLICATIONS

This application is a continuation of U.S. patent application Ser. No. 12/014,833, filed on Jan. 16, 2008, now pending, continuation of U.S. patent application Ser. No. 12/014,840 filed on Jan. 16, 2008, now U.S. Pat. No. 8,098,553, a continuation of U.S. patent application Ser. No. 12/014,847, filed on Jan. 16, 2008, now abandoned, a continuation of U.S. patent application Ser. No. 12/014,828, filed Jan. 16, 2008, now U.S. Pat. No. 8,121,005; all of which are continuations of U.S. patent application Ser. No. 11/045,485, filed on Jan. 31, 2005, now U.S. Pat. No. 7,573,795, and which claims the benefit of Korean Patent Application Nos. 2004-7969, filed on Feb. 6, 2004, and 2004-106537, filed on Dec. 15, 2004 in the Korean Intellectual Property Office, the disclosures of which are incorporated herein by reference.

BACKGROUND OF THE INVENTION

1. Field of the Invention

The present invention relates to a write-once disc, and more particularly, to a method of and apparatus for recording data on a write-once disc to access information required to use the write-once disc more quickly, a method of and apparatus for reproducing a write-once disc, and a write-once disc used with the above methods and apparatuses.

2. Description of the Related Art

New information can be recorded repeatedly on a rewritable disc on which information has already been recorded. However, when new information is recorded on a write-once disc, since information that has already been recorded may not be erased or recorded over, a new location must be allocated in order to update the information already recorded.

Generally, only information which has been finally updated is meaningful. Therefore, to read the information which has been finally updated, an update area is allocated to a data area of the disc, and a data recording and/or reproducing apparatus detects the information which has been finally updated by searching for the update area in which updated information is recorded. When large amounts of information are recorded in the update area, it takes a lot of time to detect desired information.

On a write-once disc for which defect management by a data recording and/or reproducing apparatus is performed, there are areas to record information for managing defects generated while the write-once disc is being used and information indicating a recording status of the write-once disc. According to a characteristic of the write-once disc and, unlike a rewritable disc, since updated information cannot be repeatedly recorded at a location where existing information has been recorded when an update of the defect management information is required, the updated information must be recorded at an empty location. Accordingly, a relatively wide update area is necessary.

In general, the update area is allocated to a lead-in area or a lead-out area on the disc. However, sometimes, the update area may be allocated to a data area in order to increase the space available for an update count according to a user's designation. When finally updated information required to use the write-once disc is recorded in the update area allocated to the data area, and when information indicating that the update area is allocated to the data area and information indicating a location of the update area are included in the finally updated information, the finally updated information or a location in which the finally updated information is recorded cannot be detected, even if the entire update area allocated to the lead-in area or the lead-out area is sought.

Further, even if a data recording and/or reproducing apparatus detects that the finally updated information is recorded in the update area allocated to the data area, if the size of the update area is large, it may take a considerable amount of time to search the finally updated information recorded in the update area.

SUMMARY OF THE INVENTION

Aspects of the present invention provide a write-once disc having recorded thereon information having a data structure by which an access time for reading updated information required to use the write-once disc can be reduced.

Aspects of the present invention also provide a data recording apparatus and method by which an access time for reading updated information required to use a write-once disc can be reduced.

Aspects of the present invention also provide a data reproducing apparatus and method by which an access time for reading updated information required to use a write-once disc can be reduced.

Additional aspects and/or advantages of the invention will be set forth in part in the description which follows and, in part, will be obvious from the description, or may be learned by practice of the invention.

According to an aspect of the present invention, there is provided a write-once disc including: a plurality of update areas in which a predetermined kind of updated information is recorded; at least one main access information area in which main access information is recorded, the main access information indicating a final update area in which finally updated information is recorded among the plurality of update areas; and at least one sub access information area in which sub access information is recorded, the sub access information indicating a location of the finally updated information recorded in the final update area.

According to another aspect of the present invention, there is provided a write-once disc including: a plurality of update areas in which a predetermined kind of updated information is recorded; and at least one access information area in which access information is recorded, the access information indicating a final update area in which finally updated information is recorded among the plurality of update areas, wherein the access information includes location information of the plurality of update areas, first flag information indicating the final update area in which finally updated information is recorded among the plurality of update areas, and second flag information indicating a location of the finally updated information recorded in the final update area.

According to another aspect of the present invention, there is provided a write-once disc including: a plurality of update areas, which are used in a predetermined order, and in which a predetermined kind of updated information is recorded; and at least one access information area in which access information including location information of the plurality of update areas is recorded in recording block units, wherein a final update area in which the predetermined kind of finally updated information is recorded among the plurality of update areas is indicated using the number of recording blocks in which the access information is recorded.

According to another aspect of the present invention, there is provided a data recording apparatus including: a write/read unit writing or reading information on or from a write-once disc; and a controller controlling the write/read unit to record a predetermined kind of finally updated information in one of a plurality of update areas allocated to the write-once disc, record main access information in at least one main access information area allocated to the write-once disc in order to indicate a final update area in which the finally updated information is recorded, and record sub access information in at least one sub access information area allocated to the write-once disc in order to indicate a location of the finally updated information recorded in the final update area.

According to another aspect of the present invention, there is provided a data recording apparatus including: a write/read unit writing or reading information on or from a write-once disc; and a controller controlling the write/read unit to record a predetermined kind of finally updated information in one of a plurality of update areas allocated to the write-once disc and record access information indicating a final update area in which the finally updated information is recorded in at least one access information area allocated to the write-once disc, wherein the access information includes location information of the plurality of update areas, first flag information indicating the final update area, and second flag information indicating a location of the finally updated information recorded in the final update area.

According to another aspect of the present invention, there is provided an apparatus for recording data on a write-once disc having a plurality of update areas used in a predetermined order and at least one access information area, the apparatus including: a write/read unit writing or reading information on or from the write-once disc; and a controller controlling the write/read unit to record a predetermined kind of updated information in one of the plurality of update areas and record access information including location information of the plurality of update areas in the access information area in recording block units and indicating a final update area in which the predetermined kind of finally updated information is recorded among the plurality of update areas using the number of recording blocks in which the access information is recorded.

According to another aspect of the present invention, there is provided a method of recording data on a write-once disc having a plurality of update areas used in a predetermined order and at least one access information area, the method including: recording a predetermined kind of updated information in one of the plurality of update areas; and indicating a final update area in which the predetermined kind of finally updated information is recorded among the plurality of update areas using the number of recording blocks in which access information is recorded by recording the access information including location information of the plurality of update areas in the access information area in recording block units.

According to another aspect of the present invention, there is provided a data reproducing apparatus including: a reader reading data recorded on a write-once disc; and a controller controlling the reader to obtain information of a final update area in which a predetermined kind of finally updated information is recorded among a plurality of update areas included in the write-once disc from at least one main access information area allocated to the write-once disc and obtain location information of the final update area in which the predetermined kind of finally updated information is recorded from a sub access information area included in the final update area and obtaining the predetermined kind of finally updated information.

According to another aspect of the present invention, there is provided a data reproducing apparatus including: a reader reading data recorded on a write-once disc; and a controller controlling the reader to obtain finally updated access information from at least one access information area allocated to the write-once disc, obtaining information of a final update area in which a predetermined kind of finally updated information is recorded among a plurality of update areas included in the write-once disc from the obtained access information, and obtaining the predetermined kind of finally updated information based on the obtained information of the final update area, wherein the access information includes location information of the plurality of update areas, first flag information indicating the final update area, and second flag information indicating a location of the finally updated information recorded in the final update area.

According to another aspect of the present invention, there is provided an apparatus for reproducing a write-once disc having a plurality of update areas used in a predetermined order and at least one access information area, the apparatus including: a reader reading data recorded on the write-once disc; and a controller controlling the reader to read data by accessing the access information area, determining the number of recording blocks in which access information is recorded, determining a final update area in which a predetermined kind of finally updated information is recorded among the plurality of update areas on the basis of the determined number of recording blocks, obtaining finally updated access information from a recording block in which the access information is finally recorded in the access information area, obtaining location information of the final update area from the finally updated access information, and controlling the reader to read the predetermined kind of finally updated information recorded in the final update area.

According to another aspect of the present invention, there is provided a method of reproducing a write-once disc having a plurality of update areas used in a predetermined order and at least one access information area, the method including: accessing the access information area and determining a final update area in which a predetermined kind of finally updated information is recorded among the plurality of update areas on the basis of the number of recording blocks in which access information is recorded; obtaining finally updated access information from a recording block in which the access information is finally recorded in the access information area; obtaining location information of the final update area from the finally updated access information; and obtaining the predetermined kind of finally updated information recorded in the final update area.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1A:
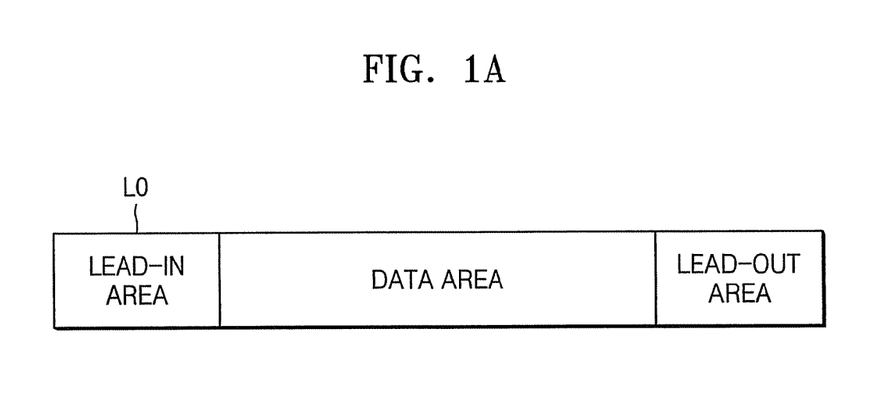
FIGS. 1A and 1B are structures of a write-once disc according to an embodiment of the present invention.
Figure 1B:
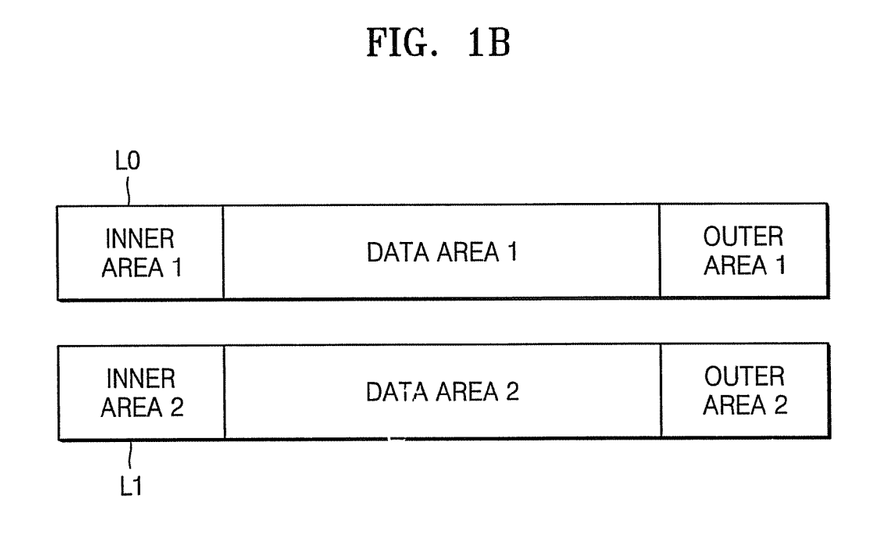

FIGS. 1A and 1B are structures of a write-once disc according to an embodiment of the present invention. FIG. 1A is a structure of a write-once disc having a single recording layer L0, and FIG. 1B is a structure of a write-once disc having a double recording layer (i.e., recording layers L0 and L1).

The write-once disc having a single recording layer L0 shown in FIG. 1A includes a lead-in area, a data area, and a lead-out area arranged from the inner circumference to the outer circumference. By way of comparison, each of a first recording layer L0 and a second recording layer L1 of the write-once disc having a double recording layer as shown in FIG. 1B includes a lead-in area in inner area 1 and inner area 2, a data area 1 and data area 2, and a lead-out area in an outer area 1 and outer area 2 arranged from the inner circumference to the outer circumference, respectively. However, it is understood that additional recording layers may be used, and the any such recording layers may be write-once, read only or rewritable and can have varying recording densities.

Figure 2:
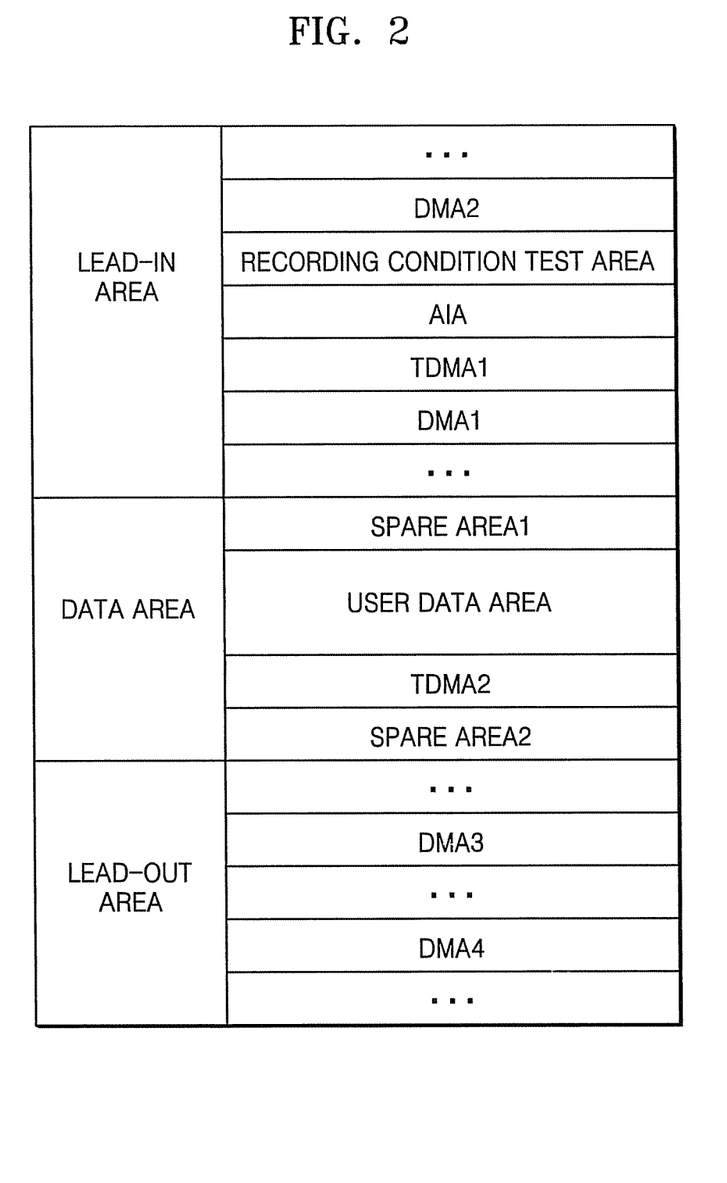
FIG. 2 is a detailed structure of a write-once disc having a single recording layer according to an embodiment of the present invention.

FIG. 2 is a detailed structure of the write-once disc having a single recording layer as shown in FIG. 1A according to an embodiment of the present invention. Referring to FIG. 2, the lead-in area includes a first disc management area (DMA1), a second disc management area (DMA2), a first temporary disc management area (TDMA1), an access information area (AIA), and a recording condition test area. The lead-out area includes a third disc management area (DMA3) and a fourth disc management area (DMA4). Also, the lead-out area may further include at least one of a temporary defect management area, a recording condition test area, an AIA or combinations thereof. That is, there may be at least one each of the AIA, the DMA, the TDMA, and the recording condition test area in at least one of the lead-in area and/or the lead-out area.

The AIA is an area to record access information indicating a location at which update information such as defect management information that a recording and/or reproducing apparatus should obtain to use a write-once disc is recorded. The access information and the AIA will be described later.

The data area includes a first spare area (spare area 1), a user data area, a second temporary disc management area (TDMA2), and a second spare area (spare area 2). The TDMA1 included in the lead-in area is assigned when manufacturing based on the specification of the write-once disc according to the present embodiment. However, the first spare area, the TDMA2, and the second spare area included in the data area are allocated to the data area by a user's selection in a process of initializing the write-once disc.

Figure 3A:
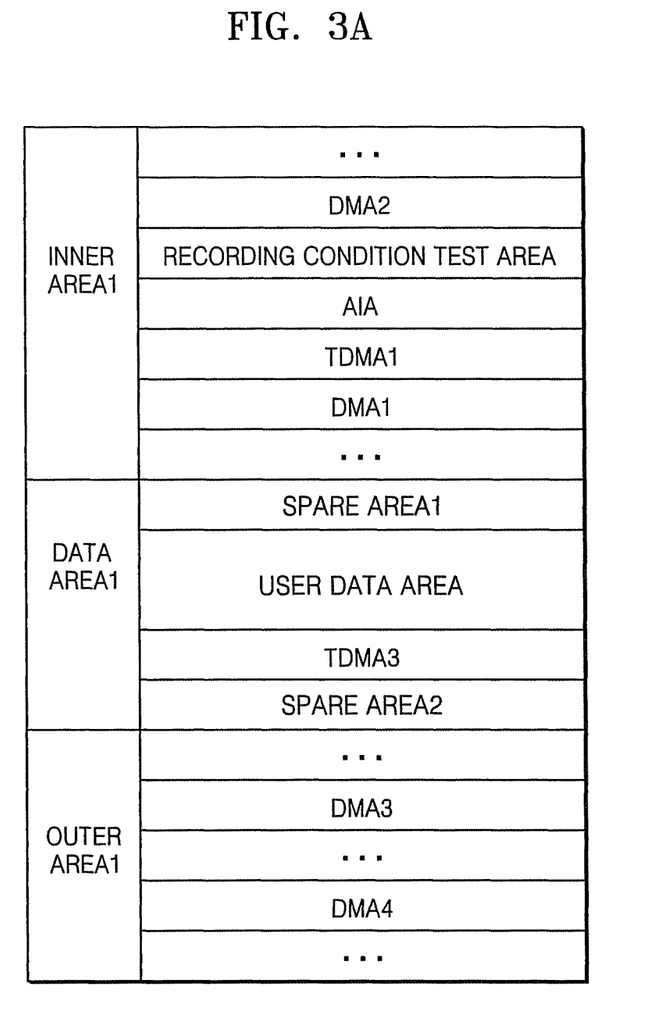
FIGS. 3A and 3B are detailed structures of a write-once disc having a double recording layer according to an embodiment of the present invention.
Figure 3B:
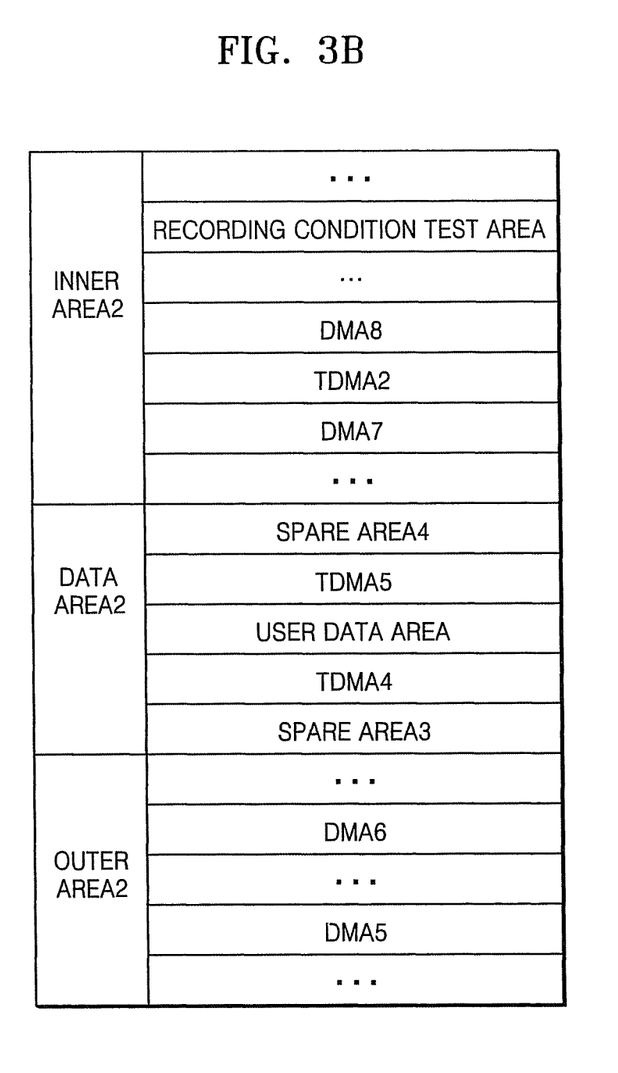

FIGS. 3A and 3B are detailed structures of a write-once disc having a double recording layer according to an embodiment of the present invention as shown in FIG. 1B. FIG. 3A is a structure of a first recording layer L0, and FIG. 3B is a structure of a second recording layer L1. The structure of the first recording layer L0 shown in FIG. 3A is identical to the structure of the write-once disc having a single recording layer shown in FIG. 2. The structure of the second recording layer L1 shown in FIG. 3B is similar to the structure of the first recording layer L0. However, in the structure of the second recording layer L1, the AIA is not allocated to a second inner area (inner area 2), and two TDMAs (TDMA 4 and TDMA 5) are allocated to a second data area (data area 2).

The write-once disc having a double recording layer includes five TDMAs; TDMA1 through TDMA5. Locations and sizes of the TDMA1 and TDMA2 are well known to conventional recording apparatuses and/or reproducing apparatuses. However, TDMA3, TDMA4, and the TDMA5 need to be allocated to data areas by a user or a recording and/or reproducing apparatus when a disc initialization is performed to use the write-once disc having a double recording layer. When a temporary disc management structure (TDMS) is recorded in the TDMA1, a temporary disc definition structure (TDDS) including sizes and locations of TDMAs allocated to the data areas is recorded in the TDMA1.

Figure 4A:
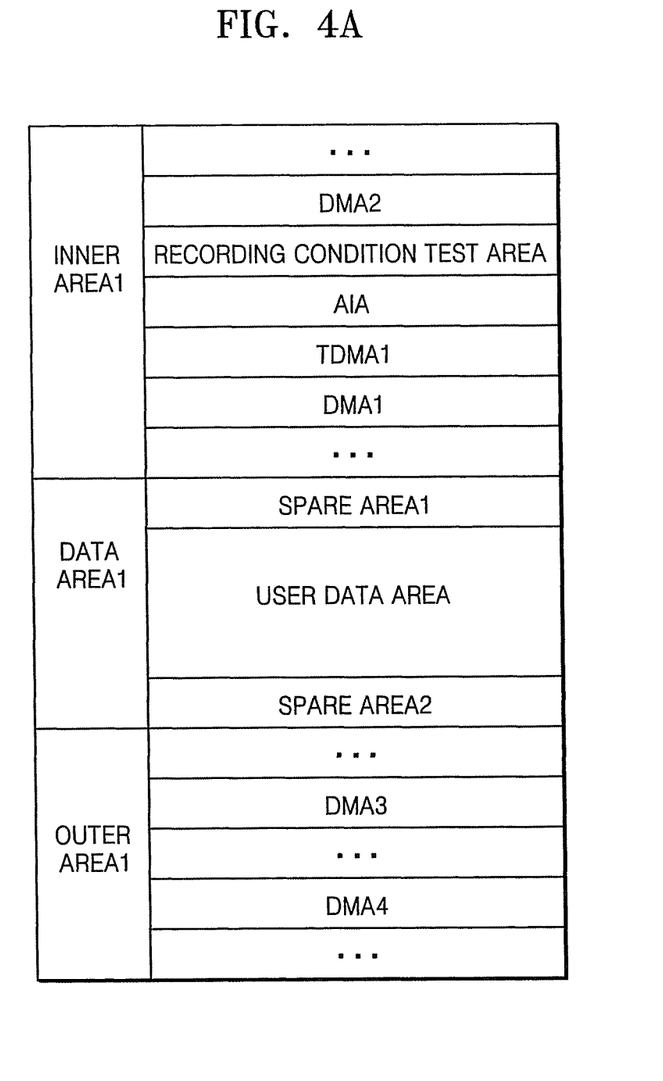
FIGS. 4A and 4B are detailed structures of a write-once disc having a double recording layer according to another embodiment of the present invention.
Figure 4B:
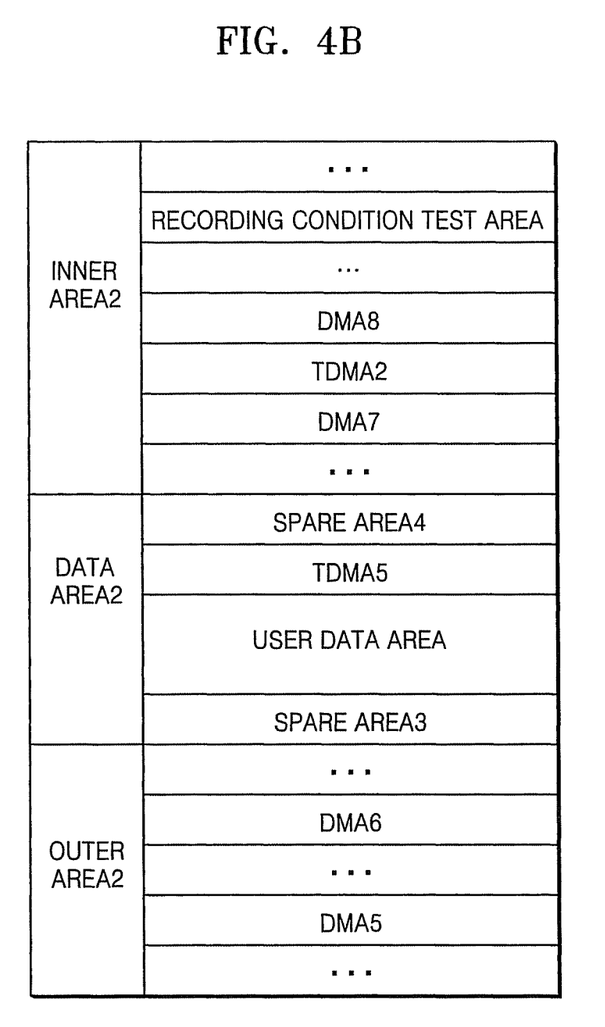

FIGS. 4A and 4B are detailed structures of a write-once disc having a double recording layer as shown in FIG. 1B according to another embodiment of the present invention. FIG. 4A is a structure of a first recording layer L0, and FIG. 4B is a structure of a second recording layer L1. A TDMA1, a TDMA2, and a TDMA5 are allocated to the write-once disc having a double recording layer as shown in FIGS. 4A and 4B. That is, besides the well known TDMA1 and TDMA2, only the TDMA5 is allocated to a second data area (data area 2) by a user or a recording and/or reproducing apparatus when a disc initialization is performed to use the write-once disc having a double recording layer.

Areas, such as TDMAs allocated to a write-once disc, and a process of recording data in the areas will now be described. A TDMA is an area to record a TDMS for management of the write-once disc before finalization of the write-once disc. The finalization of the write-once disc is an operation preventing the write-once disc from being recorded again. When data cannot be recorded on the write-once disc any more by a selection of a user, or when data cannot additionally be recorded on the write-once disc, the write-once disc is finalized.

The TDMS includes a temporary disc defect list (TDFL), a TDDS, and a space bit map (SBM). The TDFL includes information indicating an area in which a defect is generated and information indicating a corresponding substitute area in a spare area. The TDDS to manage the TDFL includes a location pointer indicating a location in which the TDFL is recorded, a location pointer indicating a location in which the SBM is recorded, information indicating locations and sizes of spare areas allocated to data areas, and information indicating locations and sizes of the TDMAs allocated to the data areas. The SBM shows a data recording status of the write-once disc with a bit map by allocating different bit values to clusters in which data is recorded in cluster units, which are data recording units, and clusters in which data is not recorded.

Figure 11:
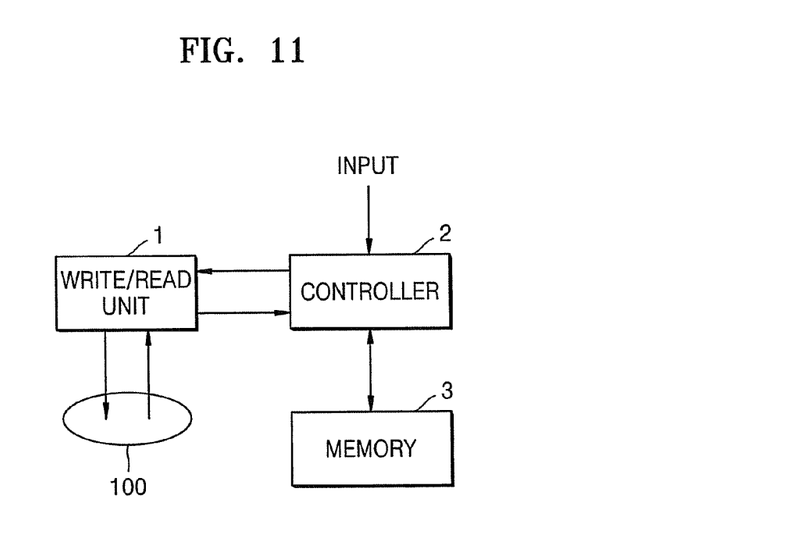
FIG. 11 is a block diagram of a data recording and/or reproducing apparatus according to an embodiment of the present invention.

When the write-once disc is loaded into the recording and/or reproducing apparatus such as that shown in FIG. 11, it is required that the TDDS is quickly read and reproduced from the finally updated TDMS of the write-once disc in order to use the write-once disc in the apparatus.

Commonly, when the write-once disc is loaded into the recording apparatus and/or the reproducing apparatus, the recording apparatus and/or the reproducing apparatus determines how to manage the write-once disc and how to record or reproduce data by reading information from the lead-in area and/or the lead-out area. If an amount of information recorded in the lead-in area and/or the lead-out area is large, more time is taken to prepare to record or reproduce data after the write-once disc is loaded. Therefore, a concept of the TDMS is used, and the TDMS generated while data is recorded on or reproduced from the write-once disc is recorded in the TDMA, which is separated from a defect management area, and allocated to the lead-in area and/or the lead-out area.

When the write-once disc is finalized, the TDMS, i.e., the TDFL and the TDDS, recorded in the TDMA is finally recorded in a DMA since an information access to quickly use the write-once disc is possible by allowing the recording or reproducing apparatus to read only meaningful information from the defect management area by storing only finally meaningful information among TDFLs and TDDSs, which are updated and recorded several times, in the DMA.

Figure 5A:
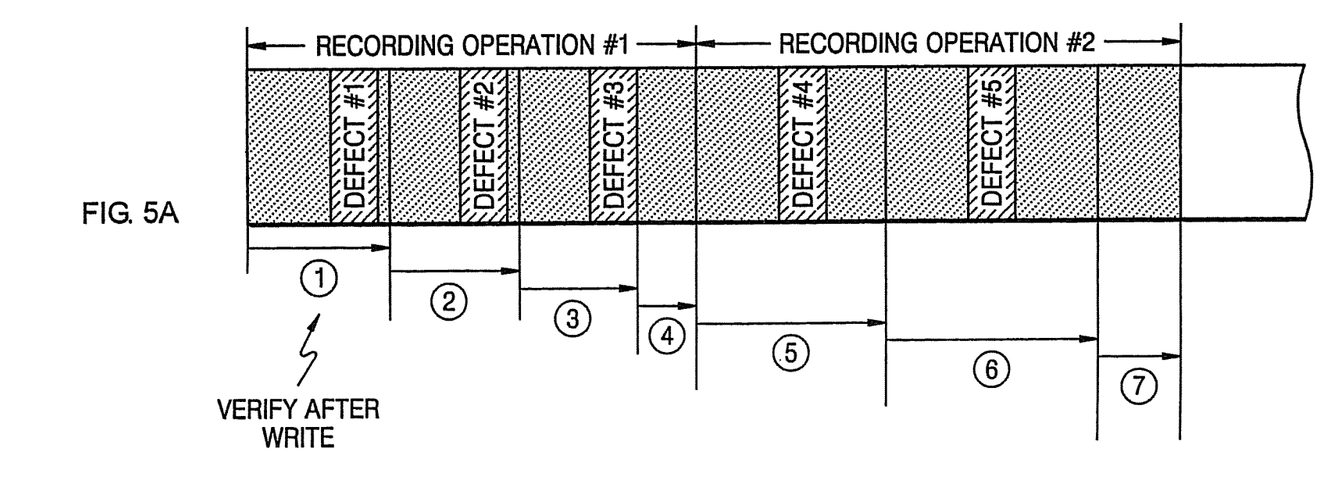
FIGS. 5A and 5B illustrate a process of recording data in a user data area and a spare area, respectively, according to an embodiment of the present invention.
Figure 5B:
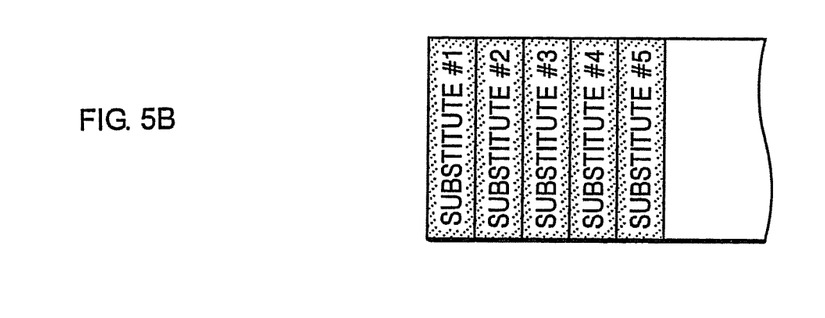

FIGS. 5A and 5B illustrate a process of recording data in a user data area and a spare area according to an embodiment of the present invention, which is applicable to both single layer and double layer write-once discs.

FIG. 5A shows the user data area, and FIG. 5B shows the spare area. A method of recording user data in the user data area includes a continuous recording mode and/or a random recording mode. The user data is recorded continuously and sequentially in the continuous recording mode and randomly in the random recording mode. Zones 501 through 507 indicate units in which verification after recording is performed according to a verify-after-write operation.

A recording apparatus writes the user data in the zone 501 and verifies whether the user data has been normally written or a defect has been generated in the zone 501. If a portion in which the defect has been generated is found, the portion is designated as a defect area (i.e., defect #1), and the recording apparatus rewrites the user data, which has been written in the defect #1, in the spare area shown in FIG. 5B. A portion in which the user data that has been written in the defect #1 is rewritten is called a substitute #1. The recording apparatus writes the user data in the zone 502 and verifies whether the user data has been normally written or a defect has been generated in the zone 502. If a portion in which a defect is generated is found, the portion is designated as a defect area (i.e., defect #2). Likewise, a substitute #2 corresponding to the defect #2 is generated. Also, in the zone 503, a defect #3 and a substitute #3 are generated. In the zone 504, a defect area does not exist since a portion in which a defect has been generated is not found.

If an end of a recording operation #1 is predicted after the user data is written and verified, that is, if a user pushes an eject button or if recording of the user data allocated to a recording operation is finished, the recording apparatus writes information related to the defect #1, and the defect #2, and the defect #3, which are defect areas generated in the zones 501 through 504, in the TDMA as a TDFL #1. Also, a management structure to manage the TDFL #1 is written in the TDMA as a TDDS #1.

The recording operation is a work unit determined by an intention of the user or a desired amount of recording work. In the present embodiment, the recording operation indicates a period from when the write-once disc is loaded and a recording work of predetermined information is performed to when the write-once disc is unloaded from the recording apparatus. However, it is understood that the work unit may be defined in a different manner such as by time periods.

When the write-once disc is loaded again, a recording operation #2 starts, a recording condition in the recording condition test area is tested, and the user data is written on the basis of the test result. That is, in the recording operation #2, the user data is written in zones 505 through 507 in the same manner of the recording operation #1, and a defect #4, a defect #5, a substitute #4, and a substitute #5 are generated. When the recording operation #2 ends, the recording apparatus writes information related to the defect #4 and the defect #5 in the TDMA as a TDFL #2. Also, a management structure to manage the TDFL #2 is written in the TDMA as a TDDS #2.

As shown in FIGS. 2, 3A, 3B, 4A, and 4B, when a plurality of TDMAs and spare areas are allocated to the write-once disc, the TDMAs and spare areas are used in a predetermined order. For example, when a data write path applied to the write-once disc having a double recording layer shown in FIGS. 3A and 3B is an opposite track path. In an opposite track path where data is recorded from a first inner area of the first recording layer L0 to a first outer area of the first recording layer L0 and a second inner area of the second recording layer L1 to a second outer area of the second recording layer L1. Further, data in the spare areas is recorded beginning with the first spare area of the first recording layer L0. When the first spare area is full, the second spare area, the third spare area, and the fourth spare area are used in this sequential order.

Likewise, the TDMS is recorded in the TDMAs starting from the TDMA1 of the first recording layer L0. When the TDMA1 is full, an updated TDMS is recorded in the TDMA2 allocated to the second inner area of the second recording layer L1. When the TDMA2 is full, a newly updated TDMS is recorded in the TDMA3 allocated to the first data area of the first recording layer L0. In the shown embodiment, the TDMA1 and the TDMA2 allocated to the inner areas of the recording layers are essential to the write-once disc. However, the TDMA(s) allocated to the data areas may or may not be allocated according to a selection of the user. Therefore, the TDMS is recorded in the TDMAs allocated to the inner areas of the recording layers. When the TDMAs allocated to the inner areas of the recording layers are full, the TDMAs allocated to the data areas are used. However, it is understood that in other aspects of the present invention the TDMAs allocated to the inner areas may be non-essential.

When a finally updated TDMS is written in a TDMA allocated to a data area, a write-once disc is usually unloaded. When the write-once disc is reloaded into a recording and/or reproducing apparatus, the recording and/or reproducing apparatus must obtain the finally updated TDMS in order to use the write-once disc. However, when the TDMS is recorded in the TDMA allocated to the data area, and the recording and/or reproducing apparatus cannot recognize that the TDMS is recorded in the TDMA allocated to the data area until the apparatus accesses the TDDS included in the TDMS.

Also, even if the recording and/or reproducing apparatus recognizes that the finally updated TDMS is recorded in the TDMA allocated to the data area, if the size of the TDMA is large, it may take a significant amount of time to search the finally updated TDMS recorded in the TDMA.

In order to improve the search time, three exemplary embodiments will be described in detail below. In these three embodiments, access information (AI) indicates a location where update information such as the TDMS, and in particular, the TDDS, is recorded. Also, the update information indicates information that a recording and/or reproducing apparatus should recognize and read to use a write-once disc in an initial period when the write-once disc is loaded into the recording and/or reproducing apparatus. Also, an area in which the update information is recorded is called an update area. In the three embodiments, the update information is the TDDS, and the update area is the TDMA.

In the first embodiment, at least one main AIA for recording main AI is allocated to a lead-in area or an inner area of a write-once disc, and a sub AIA is allocated to a TDMA. When the write-once disc is loaded, a recording and/or reproducing apparatus first obtains the main AI by accessing the main AIA. The recording and/or reproducing apparatus recognizes a TDMA in which a finally updated TDDS is recorded from the main AI and then obtains sub AI by accessing a sub AIA of the TDMA. Since the recording and/or reproducing apparatus can recognize a location where the finally updated TDDS is recorded in the TDMA from the sub AI, time required to search for the finally updated TDDS in the TDMA can be reduced.

The AIA allocated to the write-once disc shown in FIGS. 2, 3A, and 4A is the main AIA according to the first embodiment. While not required, the size of the main AIA is preferably limited by minimizing an amount of main AI recorded in the main AIA and a main AI update count since it takes longer to obtain the main AI if the size of the main AIA is larger or a plurality of main AIAs are allocated. In order to minimize the main AI update count, when the TDMA in which a final TDDS is recorded is changed, the main AI is recorded in one recording unit block of the main AIA.

Figure 6:
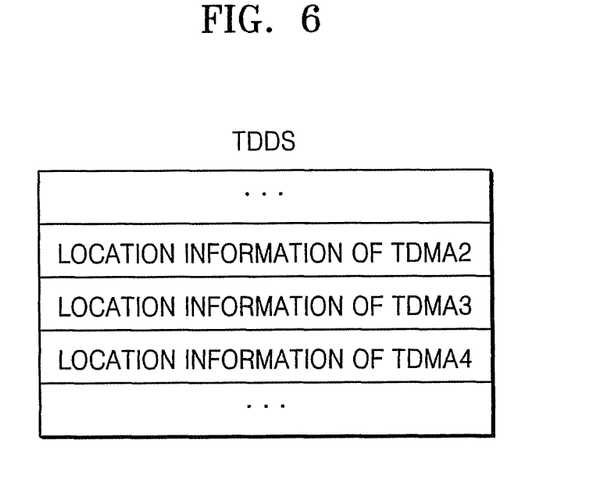
FIG. 6 is a data structure of temporary disc management information according to an embodiment of the present invention.

FIG. 6 is a data structure of a TDDS according to the first embodiment of the present invention. In the first embodiment, a data structure of a separate main AI is not defined, and the TDDS is used as the main AI. As described above, the TDDS includes location information of the TDMAs allocated to a write-once disc. As shown in FIGS. 3A and 3B, when the TDMA1 through TDMA5 are allocated to the write-once disc, the TDDS includes location information of the TDMA1 through TDMA5.

In the first embodiment, a recording and/or reproducing apparatus can recognize a TDMA in which a final TDDS is recorded from the number of recording unit blocks in which TDDSs are recorded in the main AIA.

A case where TDMA1 through TDMA5 are allocated to a write-once disc and used in an order of TDMA1, TDMA2, TDMA3, TDMA4, and TDMA5 will now be described in detail. If the main AI (i.e. the TDDS) is not recorded in the main AIA at all, the recording and/or reproducing apparatus recognizes that the final TDDS is recorded in a first TDMA (i.e., the TDMA1).

If a TDDS is recorded in only a first block of the main AIA, the recording and/or reproducing apparatus recognizes that the final TDDS is recorded in a second TDMA, i.e., the TDMA2. If TDDSs are recorded in first and second blocks of the main AIA, the recording and/or reproducing apparatus recognizes that the final TDDS is recorded in a third TDMA, i.e., the TDMA3. Likewise, if TDDSs are recorded in first through third blocks of the main AIA, the recording and/or reproducing apparatus recognizes that the final TDDS is recorded in a fourth TDMA, i.e., the TDMA4, and if TDDSs are recorded in first through fourth blocks of the main AIA, the recording and/or reproducing apparatus recognizes that the final TDDS is recorded in a fifth TDMA, i.e., the TDMA5.

As described above, the recording and/or reproducing apparatus recognizes a TDMA in which a final TDDS is recorded from the number of recording unit blocks in which TDDSs are recorded in the main AIA and reproduces the TDDS finally recorded in the main AIA. Accordingly, the recording and/or reproducing apparatus can recognize location information of the TDMA from the TDDS.

The size of the main AIA depends on the number of TDMAs allocated to a write-once disc. That is, if N TDMAs exist in the write-once disc, the main AIA includes at least (N−1) recording unit blocks, where N is a positive natural number.

The sub AIA and the sub AI will now be described with reference to FIG. 7. The sub AIA is allocated from a first block of each TDMA, and the size of the sub AIA depends on how many sub areas a TDMA including the sub AIA is divided into.

Figure 7:
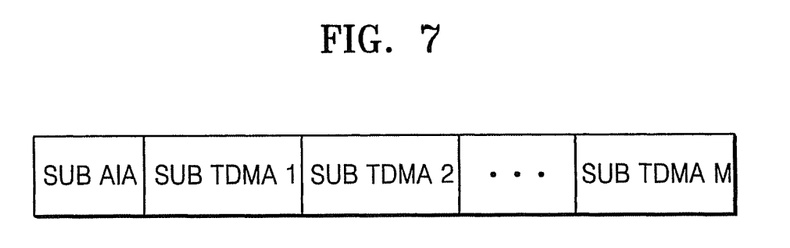
FIG. 7 is a data structure of a TDMA divided into a sub AIA and a plurality of sub areas.

FIG. 7 is a data structure of a TDMA divided into a sub AIA and a plurality of sub areas. Like the main AIA shown in FIG. 6, a TDDS is used as sub AI, and a recording and/or reproducing apparatus recognizes a sub TDMA area in which a final TDDS is recorded in the TDMA from the number of recording unit blocks in which TDDSs are recorded in the sub AIA.

As shown in FIG. 7, the TDMA is divided into first through $M^{th}$ sub TDMAs, and when the sub areas are sequentially used in a direction from the first sub TDMA to the $M^{th}$ sub TDMA, if a TDDS is not recorded in the sub AIA at all, the recording and/or reproducing apparatus recognizes that a final TDDS is recorded in the first sub TDMA, i.e., Sub TDMA 1.

If a TDDS is recorded in only a first block of the sub AIA, the recording and/or reproducing apparatus recognizes that the final TDDS is recorded in a second sub TDMA, i.e., Sub TDMA 2. If TDDSs are recorded in first and second blocks of the sub AIA, the recording and/or reproducing apparatus recognizes that the final TDDS is recorded in a third sub TDMA, i.e., Sub TDMA 3. According to the first embodiment, the size of the sub AIA allocated to each TDMA depends on the number of sub areas allocated to each TDMA. That is, if M sub areas exist in a TDMA, the sub AIA should include at least (M−1) recording unit blocks, where M is a positive natural number.

Figure 8:
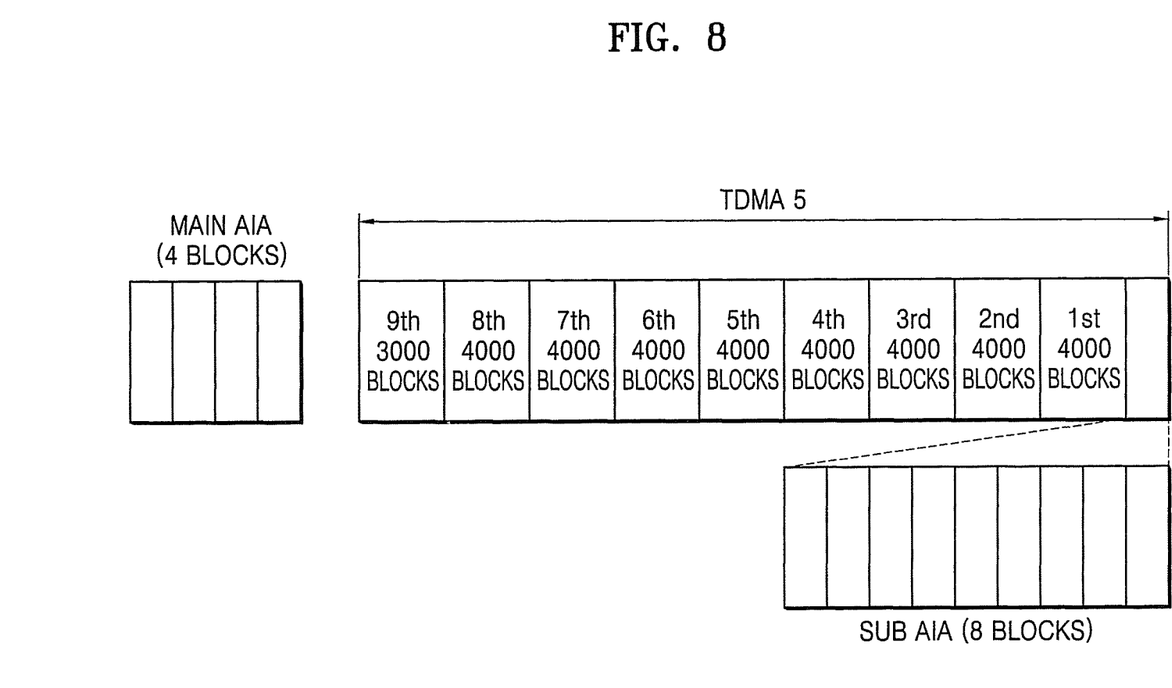
FIG. 8 illustrates a main AIA and a sub AIA according to an embodiment of the present invention.

FIG. 8 illustrates a main AIA and a sub AIA according to an embodiment of the present invention. A write-once disc according to the first embodiment is a disc in which only a TDMA5 is allocated to a data area when initialization to use the disc is performed as shown in FIGS. 4A and 4B. The main AIA includes 4 recording unit blocks. In the present embodiment, the TDMA5 includes 35,000 blocks and is divided into units of 4,000 blocks. That is, the TDMA5 includes 9 sub areas (i.e., 8 sub area of 4000 blocks each and 1 sub area of 3000 blocks). Therefore, as described above, the sub AIA includes 8 recording unit blocks (i.e., M−1, where M is 9). However, it is understood that other numbers of TDMAs, recording unit blocks and sub areas may be used.

When the write-once disc is initialized, or when a TDMA1 is used, the main AI is not recorded in the main AIA. If a location where a final TDDS is recorded is changed to a TDMA2, a recording and/or reproducing apparatus indicates that the final TDDS is recorded in the TDMA2 by recording a TDDS in a first block of the main AIA. If a location where the final TDDS is recorded is changed to the TDMA5, the recording and/or reproducing apparatus indicates that the final TDDS is recorded in a first sub area of the TDMA5 by recording TDDSs in second, third, and fourth blocks of the main AIA.

Figure 9A:
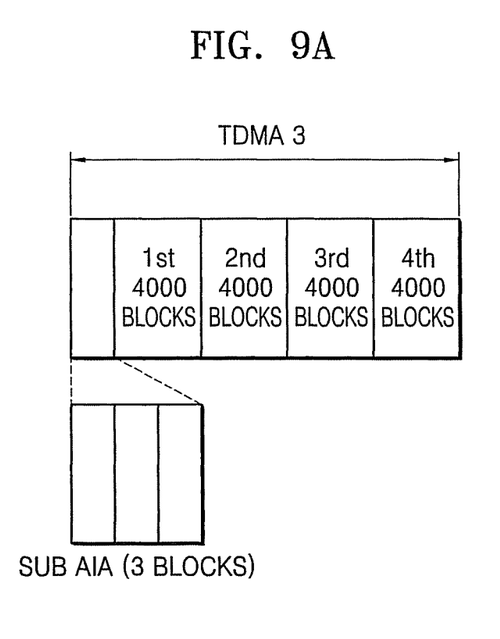
FIGS. 9A and 9B illustrate sub AIAs according to another embodiment of the present invention.
Figure 9B:
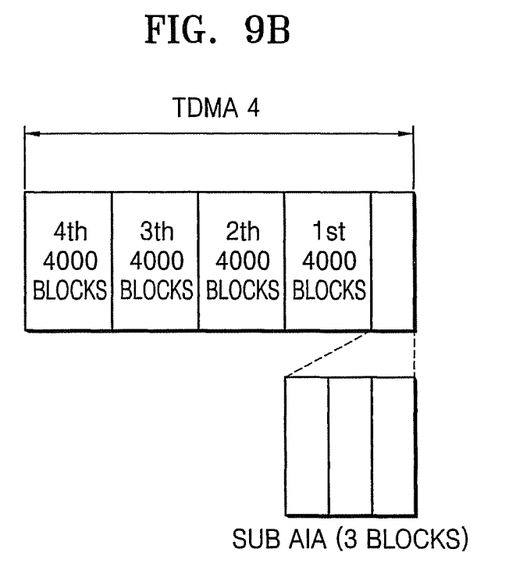

FIGS. 9A and 9B illustrate sub AIAs of a double layer write-once disc according to the first embodiment in which a TDMA3, a TDMA4, and a TDMA5 are allocated to a data area when initialization to use the disc is performed as shown in FIGS. 3A and 3B. Therefore, as described above, since 5 TDMAs are allocated, the main AIA includes 4 recording unit blocks. Each of the TDMA3 and the TDMA4 includes 16,000 blocks, and the TDMA5 includes 35,000 blocks as shown in FIG. 8.

FIG. 9A is a data structure of the TDMA3, and FIG. 9B a data structure of the TDMA4. The TDMA3 includes 4 sub areas of 4000 blocks each. Therefore, a sub AIA included in the TDMA3 includes 3 recording unit blocks. Since the TDMA4 is the same as the TDMA3, a sub AIA included in the TDMA4 also includes 3 recording unit blocks.

The TDMA5 is divided into units of 4,000 recording unit blocks and includes 9 sub areas. Therefore, as described above, a sub AIA included in the TDMA5 includes 8 recording unit blocks. It is understood that other units of recording blocks may be used instead of 4,000.

As described above with respect to FIGS. 6-9, according to the first embodiment, a recording and/or reproducing apparatus can more quickly access a location where a final TDDS is recorded by recording main AI in a main AIA and sub AI in a sub AIA.

An operation when a recording and/or reproducing apparatus accesses a location where the final TDDS is recorded from the main AI and the sub AI will now be described in more detail. According to the first embodiment, when a write-once disc in which the main AI and the sub AI are recorded is loaded in a recording and/or reproducing apparatus, the recording and/or reproducing apparatus accesses the main AIA. If information is not recorded in the main AIA at all, the recording and/or reproducing apparatus determines that a final TDDS is recorded in a TDMA1 or the write-once disc is a blank disc and accesses the TDMA1. If no data is recorded in the TDMA1, the recording and/or reproducing apparatus recognizes that the write-once disc is a blank disc and starts initialization for using the write-once disc. If data is recorded in the TDMA1, the recording and/or reproducing apparatus obtains the final TDDS from the TDMA1.

If data is recorded in the main AIA, the recording and/or reproducing apparatus reproduces a TDDS by accessing a block in which the data is finally recorded. The recording and/or reproducing apparatus recognizes which block is the block in which the data is finally recorded and recognizes in which TDMA the final TDDS is recorded. Also, the recording and/or reproducing apparatus can recognize the size of a TDMA in which the final TDDS is recorded from the reproduced TDDS and recognize whether a sub AIA is allocated to the TDMA from the size information, and if the sub AIA is allocated to the TDMA, the recording and/or reproducing apparatus can recognize the size of the sub AIA. If the sub AIA is not allocated to the TDMA in which the final TDDS is recorded, the recording and/or reproducing apparatus searches for the final TDDS from the TDMA.

However, if the sub AIA is allocated to the TDMA in which the final TDDS is recorded, the recording and/or reproducing apparatus accesses the sub AIA, recognizes up to which block data is recorded, and recognizes in which corresponding sub area of the TDMA that the final TDDS is recorded the final TDDS is recorded.

Figure 10:
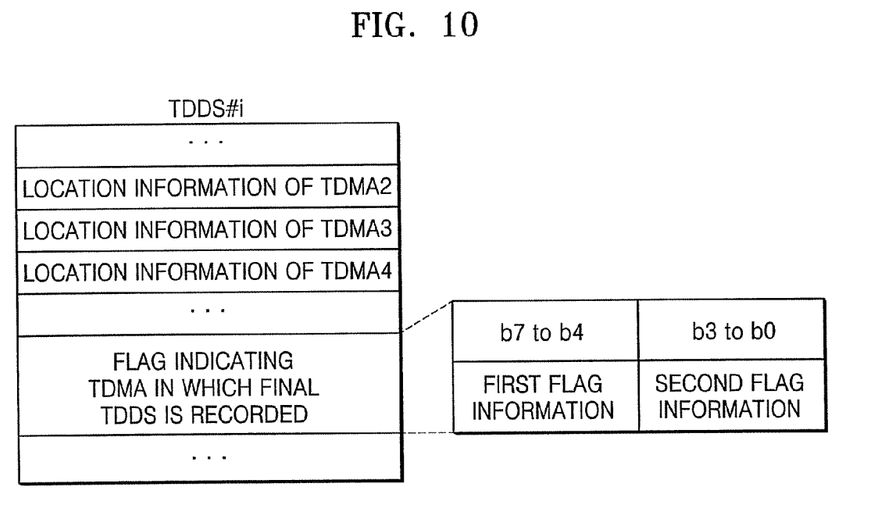
FIG. 10 is a data structure of access information according to an embodiment of the present invention.

Unlike the first embodiment shown in FIGS. 6-9, in a second embodiment shown in FIG. 10, sub AIAs are not allocated, and at least one AIA for recording AI is allocated to a lead-in area or an inner area of a write-once disc.

FIG. 10 is a data structure of access information (AI) according to the second embodiment of the present invention. The data structure of the AI shown in FIG. 10 is identical to a data structure of a TDDS. However, a flag indicating a TDMA in which a final TDDS is recorded is further included in the TDDS.

In the second embodiment illustrated in FIG. 10, the flag includes first flag information indicating the TDMA in which the final TDDS is recorded and second flag information indicating which part of the TDMA indicated by the first flag information the final TDDS is recorded in. As shown, the first flag information has 4 bits: b4 through b7. For example, it can be defined that the final TDDS is recorded in a TDMA1 when the bits b4 through b7 are "0000b", a TDMA2 when the bits b4 through b7 are "0001b", a TDMA3 when the bits b4 through b7 are "0010b", a TDMA4 when the bits b4 through b7 are "0100b", and a TDMA5 when the bits b4 through b7 are "1000b".

The second flag information has 4 bits: b0 through b3. The second flag information in a case where the first flag information indicates the TDMA5, which is divided into 5 sub areas, will now be described as an example. It can be defined that the final TDDS is recorded in a first sub area when the bits b0 through b3 are "0000b", a second sub area when the bits b0 through b3 are "0001b", a third sub area when the bits b0 through b3 are "0010b", a fourth sub area when the bits b0 through b3 are "0100b", and a fifth sub area when the bits b0 trough b4 are "1000b". It is understood that other bit values may be defined by the user or disc manufacturer.

A third embodiment is similar to the first embodiment described above with respect to FIGS. 6-9. However, unlike the first embodiment, in the third embodiment, a sub AI is not recorded in a write-once disc. Therefore, a sub AIA is not allocated to a TDMA, and the main AI and the main AIA described with respect to the first embodiment are represented as AI and an AIA, respectively, in the third embodiment.

A recording and/or reproducing apparatus in which the write-once disc according to the third embodiment is loaded records user data in a data area and a TDDS in one of a plurality of TDMAs. If a newly updated TDDS cannot be recorded in a TDMA in which a previous TDDS is recorded since the TDMA is full, the newly updated TDDS is recorded in one of the plurality of TDMAs based on a predetermined order of use. Also, the newly updated TDDS is recorded in one recording block of the AIA as the AI.

A reproducing apparatus in which the write-once disc according to the third embodiment is loaded accesses the AIA and determines a final TDMA in which a finally updated TDDS is recorded among the plurality of TDMAs on the basis of the number of recording blocks in which the AI is recorded. Then, the reproducing apparatus obtains the finally updated AI from a recording block, which is finally recorded in the final TDMA. The reproducing apparatus obtains location information of the final TDMA in which the finally updated TDDS is recorded from the finally updated AI. Finally, the reproducing apparatus obtains the finally updated TDDS from the final TDMA. Since a TDDS recorded as the AI in the AIA is recorded in the AIA only in a case where a TDMA in which an updated TDDS is recorded is changed, the TDDS may be different from the finally updated TDDS.

FIG. 11 is a block diagram of a data recording and/or reproducing apparatus according to an embodiment of the present invention. Referring to FIG. 11, the data recording and/or reproducing apparatus includes a write/read unit 1, a controller 2, and a memory 3. Under the control of the controller 2, the write/read unit 1 writes data on a write-once disc 100 and reads the data recorded on the write-once disc 100. The write-once disc 100 is a write-once disc according to the first, second or third embodiments of the inventions shown in FIGS. 1-10.

The controller 2 controls the write/read unit 1 to write main AI, sub AI, and/or AI according to aspects of the present invention on the write-once disc 100. Also, when the write-once disc 100 is reproduced, when the write-once disc 100 is loaded, the data recording and/or reproducing apparatus obtains a TDDS finally updated on the write-once disc 100 from information recorded in a main AIA, a sub AIA, and/or an AIA according to the first through third embodiments described above.

A reproducing operation of the write-once disc 100 according to aspects of the present invention by a reproducing only apparatus will now be described. Even if it is not shown, a structure of a reproducing apparatus according to the present invention is similar to a structure of the recording and reproducing apparatus shown in FIG. 11. However, since it is a reproducing only apparatus, a reader is included instead of the write/read unit 1. The read unit of the reproducing only apparatus reads data recorded on the write-once disc 100 under the control of a controller of the reproducing apparatus. The write-once disc 100 is a write-once disc according to the first, second or third embodiment as described above with respect to FIGS. 1-10.

When the write-once disc 100 is loaded in the reproducing apparatus, the controller of the reproducing apparatus obtains the TDDS finally updated on the write-once disc 100 from the information recorded in the main AIA, the sub AIA, and/or the AIA described above.

The operations of the recording and reproducing apparatus and the reproducing apparatus from the descriptions of the embodiments described above will be easily understood by those skilled in the art. Further, it is understood that all or portions of the methods and/or controller can be implemented as computer software encoded on a computer readable medium for use by a general and/or special purpose computer. Additionally, while described in terms of write-once media, it is understood that aspects of the present invention can be implemented using rewritable media, especially when implementing write-once partitions or areas.

As described above, according to embodiments of the present invention, an access time for reading a predetermined kind of information required to use a write-once disc can be reduced. In particular, when a plurality of update areas for writing updated information required to use the write-once disc exist, a recording apparatus or a reproducing apparatus can quickly and easily determine an update area in which finally updated information is recorded among the plurality of update areas.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A write-once disc, comprising:
a lead-in area in which a first temporary defect management area (TDMA) is arranged, and
a data area in which a second temporary defect management area (TDMA) and a third temporary defect management area (TDMA) are arranged,
wherein a temporary defect management structure comprising a temporary disc definition structure and a temporary defect list is recorded in the at least one of the first TDMA, the second TDMA, and the third TDMA,
the temporary disc definition structure comprises information which is used to determine whether the second TDMA and the third TDMA are allocated in the data area, and information on the recording position of the temporary defect list,
the temporary defect list comprises information on a location of a defective block and information on a location of a replacement block corresponding to the defective block,
a first data block and a second data block, respectively corresponding to the second TDMA and the third TDMA are arranged in the lead-in area, and
which TDMA among the first TDMA, the second TDMA and the third TDMA comprises a last temporary defect management structure is determined according to whether access information is recorded in the first data block and the second data block.

2. A data reproducing apparatus for use with a write-once disc, the apparatus comprising:
a reader to read data recorded on the write-once disc comprising a lead-in area in which a first temporary defect management area (TDMA) is arranged, and a data area in which a second temporary defect management area (TDMA) and a third temporary defect management area (TDMA) are arranged; and
a controller to determine which TDMA among the first TDMA, the second TDMA and the third TDMA comprises a last temporary defect management structure according to whether access information is recorded in a first data block and a second data block which are arranged in the lead-in area of the write-once disc, the first data block and the second data block, respectively corresponding to the second TDMA and the third TDMA,
wherein a temporary defect management structure comprising a temporary disc definition structure and a temporary defect list is recorded in the at least one of the first TDMA, the second TDMA, and the third TDMA,
the temporary disc definition structure comprises information which is used to determine whether the second TDMA and the third TDMA are allocated in the data area, and information on the recording position of the temporary defect list, and
the temporary defect list comprises information on a location of a defective block and information on a location of a replacement block corresponding to the defective block.

* * * * *